United States Patent
Hira

(10) Patent No.: US 11,695,697 B2
(45) Date of Patent: *Jul. 4, 2023

(54) PERFORMING IN-LINE SERVICE IN PUBLIC CLOUD

(71) Applicant: Nicira, Inc., Palo Alto, CA (US)

(72) Inventor: Mukesh Hira, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,713

(22) Filed: Sep. 14, 2020

(65) Prior Publication Data

US 2021/0105208 A1 Apr. 8, 2021

Related U.S. Application Data

(63) Continuation of application No. 16/109,395, filed on Aug. 22, 2018, now Pat. No. 10,778,579.

(Continued)

(51) Int. Cl.
*H04L 45/64* (2022.01)
*H04L 45/745* (2022.01)
(Continued)

(52) U.S. Cl.
CPC .......... *H04L 45/745* (2013.01); *H04L 12/66* (2013.01); *H04L 41/0803* (2013.01);
(Continued)

(58) Field of Classification Search
None
See application file for complete search history.

(56) References Cited

U.S. PATENT DOCUMENTS 6,108,300 A 8/2000 Coile et al.
6,832,238 B1 12/2004 Sharma et al.
(Continued)

FOREIGN PATENT DOCUMENTS

CN 1792062 A 6/2006
CN 101764752 A 6/2010
(Continued)

OTHER PUBLICATIONS

Lee, Wonhyuk, et al., "Micro-Datacenter Management Architecture for Mobile Wellness Information," 2014 International Conference on IT Convergence and Security, Oct. 28-30, 2014, 4 pages, IEEE, Beijing, China.
(Continued)

*Primary Examiner* — Faiyazkhan Ghafoerkhan
(74) *Attorney, Agent, or Firm* — Adeli LLP

(57) ABSTRACT

Some embodiments provide a novel way to insert a service (e.g., a third party service) in the path of a data message flow, between two machines (e.g., two VMs, two containers, etc.) in a public cloud environment. For a particular tenant of the public cloud, some embodiments create an overlay logical network with a logical overlay address space. To perform a service on data messages of a flow between two machines, the logical overlay network passes to the public cloud's underlay network the data messages with their destination address (e.g., destination IP addresses) defined in the logical overlay network. The underlay network (e.g., an underlay default downlink gateway) is configured to pass data messages with such destination addresses (e.g., with logical overlay destination addresses) to a set of one or more service machines. The underlay network (e.g., an underlay default uplink gateway) is also configured to pass to the particular tenant's public cloud gateway the processed data messages that are received from the service machine set and that are
(Continued)

addressed to logical overlay destination addresses. The tenant's public cloud gateway is configured to forward such data messages to a logical forwarding element of the logical network, which then handles the forwarding of the data messages to the correct destination machine.

19 Claims, 6 Drawing Sheets

Related U.S. Application Data

(60) Provisional application No. 62/550,675, filed on Aug. 27, 2017.

(51) Int. Cl.
*H04L 49/354* (2022.01)
*H04L 12/66* (2006.01)
*H04L 41/0803* (2022.01)
*H04L 49/00* (2022.01)
*H04L 45/00* (2022.01)
*H04L 12/46* (2006.01)

(52) U.S. Cl.
CPC .............. *H04L 45/38* (2013.01); *H04L 45/64* (2013.01); *H04L 49/354* (2013.01); *H04L 49/70* (2013.01); *H04L 12/4641* (2013.01)

(56) References Cited

U.S. PATENT DOCUMENTS

| | | |
|---|---|---|
| 7,107,360 B1 | 9/2006 | Phadnis et al. |
| 7,360,245 B1 | 4/2008 | Ramachandran et al. |
| 7,423,962 B2 | 9/2008 | Auterinen |
| 7,523,485 B1 | 4/2009 | Kwan |
| 7,953,895 B1 | 5/2011 | Narayanaswamy et al. |
| 8,264,947 B1 | 9/2012 | Tavares |
| 8,296,434 B1 | 10/2012 | Miller et al. |
| 8,432,791 B1 | 4/2013 | Masters |
| 8,514,868 B2 | 8/2013 | Hill |
| 8,719,590 B1 | 5/2014 | Faibish et al. |
| 8,902,743 B2 | 12/2014 | Greenberg et al. |
| 8,958,293 B1 | 2/2015 | Anderson |
| 9,137,209 B1 | 9/2015 | Brandwine et al. |
| 9,244,669 B2 | 1/2016 | Govindaraju et al. |
| 9,356,866 B1 | 5/2016 | Sivaramakrishnan et al. |
| 9,413,730 B1 | 8/2016 | Narayan et al. |
| 9,485,149 B1 | 11/2016 | Traina et al. |
| 9,519,782 B2 | 12/2016 | Aziz et al. |
| 9,590,904 B2 | 3/2017 | Heo et al. |
| 9,699,070 B2 | 7/2017 | Davie et al. |
| 9,832,118 B1 | 11/2017 | Miller et al. |
| 9,860,079 B2* | 1/2018 | Cohn ................ H04L 45/74 |
| 9,860,214 B2* | 1/2018 | Bian ................ H04L 63/0272 |
| 9,871,720 B1 | 1/2018 | Tillotson |
| 10,135,675 B2 | 11/2018 | Yu et al. |
| 10,193,749 B2 | 1/2019 | Hira et al. |
| 10,228,959 B1 | 3/2019 | Anderson et al. |
| 10,326,744 B1 | 6/2019 | Nossik et al. |
| 10,333,959 B2 | 6/2019 | Katrekar et al. |
| 10,341,371 B2 | 7/2019 | Katrekar et al. |
| 10,348,689 B2* | 7/2019 | Bian ................ H04L 67/141 |
| 10,348,767 B1 | 7/2019 | Lee et al. |
| 10,367,757 B2 | 7/2019 | Chandrashekhar et al. |
| 10,397,136 B2 | 8/2019 | Hira et al. |
| 10,484,302 B2 | 11/2019 | Hira et al. |
| 10,491,466 B1 | 11/2019 | Hira et al. |
| 10,491,516 B2 | 11/2019 | Ram et al. |
| 10,523,514 B2* | 12/2019 | Lee ................ H04L 41/26 |
| 10,567,482 B2 | 2/2020 | Ram et al. |
| 10,601,705 B2 | 3/2020 | Hira et al. |
| 10,673,952 B1 | 6/2020 | Cohen et al. |
| 10,764,331 B2 | 9/2020 | Hoole et al. |
| 10,778,579 B2* | 9/2020 | Hira ................ H04L 45/38 |
| 10,805,330 B2 | 10/2020 | Katrekar et al. |
| 10,812,413 B2 | 10/2020 | Chandrashekhar et al. |
| 10,862,753 B2 | 12/2020 | Hira et al. |
| 10,924,431 B2 | 2/2021 | Chandrashekhar et al. |
| 11,018,993 B2 | 5/2021 | Chandrashekhar et al. |
| 11,115,465 B2 | 9/2021 | Ram et al. |
| 11,196,591 B2 | 12/2021 | Hira et al. |
| 11,343,229 B2 | 5/2022 | Jain et al. |
| 11,374,794 B2* | 6/2022 | Hira ................ H04L 45/72 |
| 2002/0062217 A1 | 5/2002 | Fujimori |
| 2002/0199007 A1 | 12/2002 | Clayton et al. |
| 2007/0186281 A1 | 8/2007 | McAlister |
| 2007/0226795 A1 | 9/2007 | Conti et al. |
| 2007/0256073 A1 | 11/2007 | Troung et al. |
| 2008/0104692 A1 | 5/2008 | McAlister |
| 2008/0225888 A1 | 9/2008 | Valluri et al. |
| 2009/0254973 A1 | 10/2009 | Kwan |
| 2010/0037311 A1 | 2/2010 | He et al. |
| 2010/0112974 A1 | 5/2010 | Sahai et al. |
| 2010/0257263 A1* | 10/2010 | Casado ................ H04L 61/256 718/1 |
| 2010/0318609 A1 | 12/2010 | Lahiri et al. |
| 2011/0075667 A1* | 3/2011 | Li ................ H04L 45/04 370/392 |
| 2011/0075674 A1* | 3/2011 | Li ................ H04L 45/50 370/401 |
| 2011/0176426 A1 | 7/2011 | Lioy et al. |
| 2011/0317703 A1 | 12/2011 | Dunbar et al. |
| 2012/0072762 A1* | 3/2012 | Atchison ................ G06F 9/455 718/1 |
| 2012/0082063 A1 | 4/2012 | Fujita |
| 2012/0250682 A1 | 10/2012 | Vincent et al. |
| 2013/0044636 A1 | 2/2013 | Koponen et al. |
| 2013/0044641 A1 | 2/2013 | Koponen et al. |
| 2013/0044763 A1 | 2/2013 | Koponen et al. |
| 2013/0058208 A1 | 3/2013 | Pfaff et al. |
| 2013/0058335 A1 | 3/2013 | Koponen et al. |
| 2013/0060928 A1 | 3/2013 | Shao |
| 2013/0125230 A1 | 5/2013 | Koponen et al. |
| 2013/0152076 A1 | 6/2013 | Patel |
| 2013/0198740 A1 | 8/2013 | Arroyo et al. |
| 2013/0263118 A1 | 10/2013 | Kannan et al. |
| 2013/0287022 A1* | 10/2013 | Banavalikar ............ H04L 63/00 370/389 |
| 2013/0287026 A1 | 10/2013 | Davie |
| 2013/0297768 A1 | 11/2013 | Singh |
| 2013/0304903 A1 | 11/2013 | Mick et al. |
| 2013/0318219 A1 | 11/2013 | Kancherla |
| 2013/0346585 A1* | 12/2013 | Ueno ................ H04L 41/0803 709/223 |
| 2014/0010239 A1 | 1/2014 | Xu et al. |
| 2014/0052877 A1 | 2/2014 | Mao |
| 2014/0108665 A1 | 4/2014 | Arora et al. |
| 2014/0143853 A1 | 5/2014 | Onodera |
| 2014/0156818 A1 | 6/2014 | Hunt |
| 2014/0192804 A1 | 7/2014 | Ghanwani et al. |
| 2014/0226820 A1 | 8/2014 | Chopra et al. |
| 2014/0241247 A1* | 8/2014 | Kempf ................ H04W 76/12 370/328 |
| 2014/0245420 A1 | 8/2014 | Tidwell et al. |
| 2014/0280488 A1 | 9/2014 | Voit et al. |
| 2014/0280961 A1 | 9/2014 | Martinez et al. |
| 2014/0317677 A1 | 10/2014 | Vaidya et al. |
| 2014/0334495 A1 | 11/2014 | Stubberfield et al. |
| 2014/0337500 A1 | 11/2014 | Lee |
| 2014/0376560 A1 | 12/2014 | Senniappan et al. |
| 2015/0009995 A1* | 1/2015 | Gross, IV ................ H04L 69/22 370/392 |
| 2015/0016286 A1 | 1/2015 | Ganichev et al. |
| 2015/0016460 A1 | 1/2015 | Zhang et al. |
| 2015/0043383 A1* | 2/2015 | Farkas ................ H04L 45/22 370/254 |
| 2015/0052522 A1 | 2/2015 | Chanda et al. |
| 2015/0052525 A1 | 2/2015 | Raghu |
| 2015/0063360 A1 | 3/2015 | Thakkar et al. |
| 2015/0063364 A1 | 3/2015 | Thakkar et al. |
| 2015/0085870 A1* | 3/2015 | Narasimha ............ H04L 45/44 370/409 |

(56) References Cited

U.S. PATENT DOCUMENTS

| | | | |
|---|---|---|---|
| 2015/0096011 A1 | 4/2015 | Watt | |
| 2015/0098455 A1* | 4/2015 | Fritsch | H04L 12/2816 370/338 |
| 2015/0098465 A1 | 4/2015 | Pete et al. | |
| 2015/0103838 A1 | 4/2015 | Zhang et al. | |
| 2015/0106804 A1 | 4/2015 | Chandrashekhar et al. | |
| 2015/0124645 A1 | 5/2015 | Yadav et al. | |
| 2015/0128245 A1 | 5/2015 | Brown et al. | |
| 2015/0138973 A1* | 5/2015 | Kumar | H04L 45/306 370/235 |
| 2015/0139238 A1 | 5/2015 | Pourzandi et al. | |
| 2015/0163137 A1* | 6/2015 | Kamble | H04L 45/745 370/392 |
| 2015/0163145 A1 | 6/2015 | Pettit et al. | |
| 2015/0163192 A1* | 6/2015 | Jain | H04L 43/0823 370/255 |
| 2015/0172075 A1 | 6/2015 | DeCusatis et al. | |
| 2015/0172183 A1 | 6/2015 | DeCusatis et al. | |
| 2015/0172331 A1 | 6/2015 | Raman | |
| 2015/0263899 A1 | 9/2015 | Tubaltsev et al. | |
| 2015/0263946 A1 | 9/2015 | Tubaltsev et al. | |
| 2015/0263983 A1 | 9/2015 | Brennan et al. | |
| 2015/0263992 A1 | 9/2015 | Kuch et al. | |
| 2015/0264077 A1 | 9/2015 | Berger et al. | |
| 2015/0271303 A1 | 9/2015 | Neginhal et al. | |
| 2015/0281098 A1 | 10/2015 | Pettit et al. | |
| 2015/0281274 A1 | 10/2015 | Masurekar et al. | |
| 2015/0295731 A1 | 10/2015 | Bagepalli et al. | |
| 2015/0295800 A1 | 10/2015 | Bala et al. | |
| 2015/0304117 A1* | 10/2015 | Dong | H04L 12/189 370/312 |
| 2015/0326469 A1* | 11/2015 | Kern | H04L 45/50 370/254 |
| 2015/0339136 A1 | 11/2015 | Suryanarayanan et al. | |
| 2015/0350059 A1* | 12/2015 | Chunduri | H04L 45/12 370/238 |
| 2015/0350101 A1 | 12/2015 | Sinha et al. | |
| 2015/0373012 A1 | 12/2015 | Bartz et al. | |
| 2015/0381493 A1* | 12/2015 | Bansal | H04L 45/38 370/392 |
| 2016/0014023 A1* | 1/2016 | He | H04L 45/54 370/408 |
| 2016/0055019 A1 | 2/2016 | Thakkar et al. | |
| 2016/0072888 A1 | 3/2016 | Jung et al. | |
| 2016/0094364 A1 | 3/2016 | Subramaniyam et al. | |
| 2016/0094661 A1 | 3/2016 | Jain et al. | |
| 2016/0105488 A1 | 4/2016 | Thakkar et al. | |
| 2016/0124742 A1 | 5/2016 | Rangasamy et al. | |
| 2016/0134418 A1 | 5/2016 | Liu et al. | |
| 2016/0182567 A1 | 6/2016 | Sood et al. | |
| 2016/0191304 A1 | 6/2016 | Muller | |
| 2016/0198003 A1 | 7/2016 | Luft | |
| 2016/0212049 A1 | 7/2016 | Davie | |
| 2016/0226967 A1* | 8/2016 | Zhang | H04L 41/145 |
| 2016/0274926 A1 | 9/2016 | Narasimhamurthy et al. | |
| 2016/0308762 A1 | 10/2016 | Teng et al. | |
| 2016/0337329 A1 | 11/2016 | Sood et al. | |
| 2016/0352623 A1 | 12/2016 | Jayabalan et al. | |
| 2016/0352682 A1 | 12/2016 | Chang et al. | |
| 2016/0352747 A1 | 12/2016 | Khan et al. | |
| 2016/0364575 A1 | 12/2016 | Caporal et al. | |
| 2016/0380973 A1 | 12/2016 | Sullenberger et al. | |
| 2017/0005923 A1 | 1/2017 | Babakian | |
| 2017/0006053 A1 | 1/2017 | Greenberg et al. | |
| 2017/0034129 A1 | 2/2017 | Sawant et al. | |
| 2017/0034198 A1 | 2/2017 | Powers et al. | |
| 2017/0060628 A1 | 3/2017 | Tarasuk-Levin et al. | |
| 2017/0078248 A1* | 3/2017 | Bian | H04L 63/20 |
| 2017/0091458 A1 | 3/2017 | Gupta et al. | |
| 2017/0091717 A1 | 3/2017 | Chandraghatgi et al. | |
| 2017/0093646 A1 | 3/2017 | Chanda et al. | |
| 2017/0097841 A1 | 4/2017 | Chang et al. | |
| 2017/0099188 A1 | 4/2017 | Chang et al. | |
| 2017/0104365 A1 | 4/2017 | Ghosh et al. | |
| 2017/0111230 A1 | 4/2017 | Srinivasan et al. | |
| 2017/0118115 A1 | 4/2017 | Tsuji | |
| 2017/0126552 A1 | 5/2017 | Pfaff et al. | |
| 2017/0142012 A1 | 5/2017 | Thakkar et al. | |
| 2017/0149582 A1* | 5/2017 | Cohn | H04L 12/4633 |
| 2017/0163442 A1 | 6/2017 | Shen et al. | |
| 2017/0163599 A1 | 6/2017 | Shen et al. | |
| 2017/0195217 A1 | 7/2017 | Parasmal et al. | |
| 2017/0195253 A1 | 7/2017 | Annaluru et al. | |
| 2017/0222928 A1 | 8/2017 | Johnsen et al. | |
| 2017/0223518 A1 | 8/2017 | Upadhyaya et al. | |
| 2017/0230241 A1 | 8/2017 | Neginhal et al. | |
| 2017/0279826 A1 | 9/2017 | Mohanty et al. | |
| 2017/0289060 A1 | 10/2017 | Aftab et al. | |
| 2017/0302529 A1 | 10/2017 | Agarwal et al. | |
| 2017/0302535 A1* | 10/2017 | Lee | H04L 41/122 |
| 2017/0310580 A1 | 10/2017 | Caldwell et al. | |
| 2017/0317972 A1 | 11/2017 | Bansal et al. | |
| 2017/0324848 A1 | 11/2017 | Johnsen et al. | |
| 2017/0331746 A1* | 11/2017 | Qiang | H04L 12/185 |
| 2017/0359304 A1 | 12/2017 | Benny et al. | |
| 2018/0006943 A1 | 1/2018 | Dubey | |
| 2018/0007002 A1 | 1/2018 | Landgraf | |
| 2018/0013791 A1 | 1/2018 | Healey et al. | |
| 2018/0026873 A1 | 1/2018 | Cheng et al. | |
| 2018/0026944 A1 | 1/2018 | Phillips | |
| 2018/0027012 A1 | 1/2018 | Srinivasan et al. | |
| 2018/0027079 A1 | 1/2018 | Ali et al. | |
| 2018/0053001 A1 | 2/2018 | Folco et al. | |
| 2018/0062880 A1* | 3/2018 | Yu | H04L 63/20 |
| 2018/0062881 A1* | 3/2018 | Chandrashekhar | H04L 61/2592 |
| 2018/0062917 A1* | 3/2018 | Chandrashekhar | H04L 63/0428 |
| 2018/0062923 A1* | 3/2018 | Katrekar | H04L 63/10 |
| 2018/0062933 A1* | 3/2018 | Hira | G06F 9/45533 |
| 2018/0063036 A1* | 3/2018 | Chandrashekhar | H04L 63/20 |
| 2018/0063086 A1* | 3/2018 | Hira | H04L 47/32 |
| 2018/0063087 A1* | 3/2018 | Hira | G06F 9/45558 |
| 2018/0063176 A1 | 3/2018 | Katrekar et al. | |
| 2018/0063193 A1 | 3/2018 | Chandrashekhar et al. | |
| 2018/0077048 A1 | 3/2018 | Kubota et al. | |
| 2018/0083923 A1* | 3/2018 | Bian | H04L 67/141 |
| 2018/0115586 A1 | 4/2018 | Chou et al. | |
| 2018/0139123 A1* | 5/2018 | Qiang | H04L 45/24 |
| 2018/0197122 A1 | 7/2018 | Kadt et al. | |
| 2018/0336158 A1 | 11/2018 | Iyer et al. | |
| 2019/0037033 A1 | 1/2019 | Khakimov et al. | |
| 2019/0068493 A1 | 2/2019 | Ram et al. | |
| 2019/0068500 A1* | 2/2019 | Hira | H04L 49/70 |
| 2019/0068689 A1 | 2/2019 | Ram et al. | |
| 2019/0097838 A1 | 3/2019 | Sahoo et al. | |
| 2019/0173757 A1 | 6/2019 | Hira et al. | |
| 2019/0173780 A1 | 6/2019 | Hira et al. | |
| 2019/0306185 A1 | 10/2019 | Katrekar et al. | |
| 2020/0007497 A1 | 1/2020 | Jain et al. | |
| 2020/0028758 A1 | 1/2020 | Tollet et al. | |
| 2020/0067733 A1* | 2/2020 | Hira | H04L 12/4633 |
| 2020/0067734 A1 | 2/2020 | Hira et al. | |
| 2020/0177670 A1 | 6/2020 | Ram et al. | |
| 2020/0351254 A1 | 11/2020 | Xiong et al. | |
| 2021/0105208 A1* | 4/2021 | Hira | H04L 49/70 |
| 2021/0258624 A1 | 8/2021 | Yu et al. | |
| 2022/0255896 A1* | 8/2022 | Jain | H04L 63/1466 |
| 2022/0329461 A1* | 10/2022 | Hira | H04L 12/66 |

FOREIGN PATENT DOCUMENTS

| | | |
|---|---|---|
| CN | 102255934 A | 11/2011 |
| CN | 102577255 A | 7/2012 |
| CN | 102577270 A | 7/2012 |
| CN | 103957270 A | 7/2014 |
| CN | 104272672 A | 1/2015 |
| CN | 105099953 A | 11/2015 |
| CN | 103036919 B | 12/2015 |
| CN | 105144110 A | 12/2015 |
| CN | 105379227 A | 3/2016 |
| CN | 106165358 A | 11/2016 |
| CN | 107210959 A | 9/2017 |

(56) References Cited

FOREIGN PATENT DOCUMENTS

| | | | |
|---|---|---|---|
| CN | 107534603 A | 1/2018 | |
| CN | 107733704 A | 2/2018 | |
| CN | 107959689 A | 4/2018 | |
| EP | 1742430 A1 | 1/2007 | |
| EP | 3673627 A1 | 7/2020 | |
| JP | 2014075731 A | 4/2014 | |
| JP | 2015122088 A | 7/2015 | |
| JP | 2015136132 A | 7/2015 | |
| JP | 2015165700 A | 9/2015 | |
| WO | 2015068255 A1 | 5/2015 | |
| WO | 2015142404 A1 | 9/2015 | |
| WO | 2016159113 A1 | 10/2016 | |
| WO | 2018044341 A1 | 3/2018 | |
| WO | 2019040720 A1 | 2/2019 | |
| WO | 2019046071 A1 | 3/2019 | |
| WO | 2019112704 A1 | 6/2019 | |
| WO | 2020005540 A1 | 1/2020 | |
| WO | 2020041074 A1 | 2/2020 | |

OTHER PUBLICATIONS

Ling, Lu, et al., "Hybrid Cloud Solution Based on SDN Architecture," Collection of Cloud Computing Industry Application Cases, Dec. 31, 2016, 20 pages, Issue 2, China Academic Journal Publishing House. [English translation of document generated from www.onlinedoctranslator.com].

Suen, Chun-Hui, et al., "Efficient Migration of Virtual Machines between Public and Private Cloud," 2011 IEEE Third International Conference on Cloud Computing Technology and Science, Nov. 29-Dec. 1, 2011, 5 pages, IEEE, Athens, Greece.

Zheng, Guo, et al., "Study and Development of Private Cloud," Scientific View, Sep. 30, 2016, 2 pages [English translation of abstract generated from Google Translate].

Author Unknown, "Network Controller," Dec. 16, 2014, 4 pages, available at: https://web.archive.org/web/20150414112014/https://technet.microsoft.com/en-us/library/dn859239.aspx.

Black, David, et al., "An Architecture for Data Center Network Virtualization Overlays (NVO3) [draft-ietf-nvo3-arch-08]," Sep. 20, 2016, 34 pages, IETF.

Church, Mark, "Docker Reference Architecture: Designing Scalable, Portable Docker Container Networks," Article ID: KB000801, Jun. 20, 2017, 36 pages, retrieved from https://success.docker.com/article/networking.

Fernando, Rex, et al., "Service Chaining using Virtual Networks with BGP," Internet Engineering Task Force, IETF, Jul. 7, 2015, 32 pages, Internet Society (ISOC), Geneva, Switzerland, available at https://tools.ietf.org/html/draft-fm-bess-service-chaining-01.

Firestone, Daniel, "VFP: A Virtual Switch Platform for Host SDN in the Public Cloud," 14th USENIX Symposium on Networked Systems Design and Implementation, Mar. 27-29, 2017, 15 pages, USENIX, Boston, MA, USA.

International Search Report and Written Opinion of commonly owned International Patent Application PCT/US2018/047570, dated Nov. 7, 2018, 17 pages, International Searching Authority/European Patent Office.

Koponen, Teemu, et al., "Network Virtualization in Multi-tenant Datacenters," Proceedings of the 11th USENIX Symposium on Networked Systems Design and Implementation (NSDI'14), Apr. 2-4, 2014, 15 pages, Seattle, WA, USA.

Lasserre, Marc, et al., "Framework for Data Center (DC) Network Virtualization," RFC 7365, Oct. 2014, 26 pages, IETF.

Le Bigot, Jean-Tiare, "Introduction to Linux Namespaces—Part 5: NET," Jan. 19, 2014, 6 pages, retrieved from https://blog.yadutaf.fr/2014/01/19/introduction-to-linux-namespaces-part-5-net.

Merkel, Dirk, "Docker: Lightweight Linux Containers for Consistent Development and Deployment," Linux Journal, May 19, 2014, 16 pages, vol. 2014—Issue 239, Belltown Media, Houston, USA.

Non-Published commonly owned U.S. Appl. No. 17/114,322, filed Dec. 7, 2020, 50 pages, Nicira Inc.

Singla, Ankur, et al., "Architecture Documentation: OpenContrail Architecture Document," Jan. 24, 2015, 42 pages, OpenContrail.

Sunliang, Huang, "Future SDN-based Data Center Network," Nov. 15, 2013, 5 pages, ZTE Corporation, available at http://wwwen.zte.com.cn/endata/magazine/ztetechnologies/2013/no6/articles/201311/t20131115_412737.html.

Wenjie, Zhu (Jerry), "Next Generation Service Overlay Networks," IEEE P1903 NGSON (3GPP Draft), Aug. 22, 2014, 24 pages, IEEE.

Zhang, Zhe, et al., "Lark: Bringing Network Awareness to High Throughput Computing," 15th IEEE/ACM International Symposium on Cluster, Cloud and Grid Computing, May 4-7, 2015, 10 pages, IEEE, Shenzhen, China.

Lichtblau, Franziska, et al., "Detection, Classification, and Analysis of Inter-Domain Traffic with Spoofed Source IP Addresses," IMC '17: Proceedings of the 2017 Internet Measurement Conference, Nov. 2017, 14 pages, Association for Computing Machinery, London, UK.

Lin, Yu-Chuan, et al. "Development of a Novel Cloud-Based Multi-Tenant Model Creation Scheme for Machine Tools," 2015 IEEE International Conference on Automation Science and Engineering, Aug. 24-28, 2015, 2 pages, IEEE, Gothenburg, Sweden.

Non-Published Commonly Owned Related U.S. Appl. No. 17/731,232, filed Apr. 27, 2022, 37 pages, VMware, Inc.

Non-Published commonly owned U.S. Appl. No. 17/307,983, filed May 4, 2021, 119 pages, Nicira Inc.

\* cited by examiner

PERFORMING IN-LINE SERVICE IN PUBLIC CLOUD

CLAIM OF BENEFIT TO PRIOR APPLICATIONS

This application is a continuation application of U.S. patent application Ser. No. 16/109,395, filed Aug. 22, 2018, now published as U.S. Patent Publication 2019/0068500. U.S. patent application Ser. No. 16/109,395, claims the benefit of U.S. Provisional Patent Application 62/550,675, filed Aug. 27, 2017. U.S. patent application Ser. No. 16/109,395, now published as U.S. Patent Publication 2019/0068500, is incorporated herein by reference.

BACKGROUND

In private clouds today, numerous vendors provide specialized services, such as Deep Packet Inspection, Firewall, etc. In private datacenters, the administrators typically deploy such specialized services in the path of traffic that needs the service. With the proliferation of public cloud, these vendors also offer virtual appliances and service virtual machines (service VMs) that can be licensed and deployed in public cloud environments. For example, Palo Alto Networks makes its firewall available as a virtual appliance in the Amazon Web Services (AWS) marketplace.

Such appliances are mostly deployed for traffic that enters and leaves the virtual public cloud (VPC) in the datacenter, and are thus deployed facing the Internet Gateway. However, the public cloud tenants also want to route the traffic between subsets of endpoints within the virtual datacenter through the service appliance of third party vendors. Currently, this is not possible as cloud providers do not allow the routing of traffic between endpoints in a VPC to be overridden. For instance, in AWS VPC, the provider routing table has a single entry for the VPC address block and this entry cannot be modified. More specific routes that overlap with the VPC address block cannot be added.

BRIEF SUMMARY

Some embodiments provide a method for inserting a service (e.g., a third party service) in the path of a data message flow between two machines (e.g., two VMs, two containers, etc.) in a public cloud environment. For a particular tenant of the public cloud, the method in some embodiments creates an overlay logical network with a distinct overlay address space. This overlay logical network is defined on top of the public cloud's underlay network, which, in some embodiments, is the VPC network provided by the cloud provider. The VPC network in some embodiments is also a logical overlay network provided by the cloud provider, while in other embodiments, it is just a portion segregated for the particular tenant from the rest of the provider's physical network (e.g., a portion with a segregated address space for the particular tenant).

To perform one or more services on data message flows between two machines in the VPC network, the method configures one or more logical forwarding elements (e.g., a logical router) of the overlay logical network to forward such data message flows to one or more forwarding elements of the underlay network, so that the underlay network can forward the data messages to service machines that perform the service on the data message flows. For instance, in some embodiments, the method configures a logical interface (LIF) of a logical router of the logical overlay network to forward data messages that are directed to certain destination IP addresses, to an underlay default downlink gateway that is specified for the VPC network by the public cloud provider. In some such embodiments, the method defines the underlay default downlink gateway as the next hop (that is accessible through the LIF) for the data messages that are directed to certain destination IP addresses.

The method also modifies the route table of the underlay network's forwarding element (e.g., the underlay default gateway) to send data messages destined to some or all logical overlay addresses to one or more service machines that perform one or more services on the data messages. These machines can be standalone service appliances (e.g., third party service appliances, such as firewall appliances of Palo Alto Network, etc.), or they can be service machines (e.g., virtual machines, containers, etc.) executing on host computers. The service machines in some embodiments are within the public cloud, while in other embodiments the service machines can be inside or outside the public cloud.

A service machine performs one or more services on the data messages that it receives from the underlay forwarding element directly or through an intervening network fabric. After performing its service(s) on a data message, the service machine provides the message to its uplink interface that handles the forwarding of data messages to networks outside of the service machine's network. The method configures a separate route table of the service machine's uplink interface to route the processed data messages to the underlay default uplink gateway, for the particular tenant in the public cloud.

The method also configures the route table of this underlay default uplink gateway to forward data messages that are destined to some or all logical overlay addresses to the particular tenant's cloud gateway. In some embodiments, the particular tenant's cloud gateway processes data messages that enter or exit the tenant's VPC network in the public cloud. The method configures the tenant gateway to route a data message that is addressed to a logical overlay network destination address to the correct destination machine (e.g., correct VM or container) in the particular tenant's VPC.

When the destination machine sends a reply message to a message from a source machine, the destination machine's reply message in some embodiments, follows a similar path as the received data message. Specifically, in some embodiments, a logical forwarding element (e.g., a logical router) associated with the destination machine forwards the reply message to a forwarding element of the underlay network through a logical forwarding element of the overlay network (e.g., through a LIF of the logical forwarding element that has the underlay default gateway as its next hop for some logical overlay addresses). The underlay network forwarding element (e.g., the underlay default gateway) is configured to send data messages destined to some or all logical overlay addresses to one or more service machines.

After processing the reply message, the service machine again provides the message to its uplink interface, which again has its route table configured to route the processed reply data message to the underlay default uplink gateway. This gateway is again configured to forward the processed data messages to the particular tenant's cloud gateway, which again is configured to route a message that is addressed to a logical overlay network destination address to the correct destination machine (e.g., correct VM or container) in the particular tenant's VPC.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
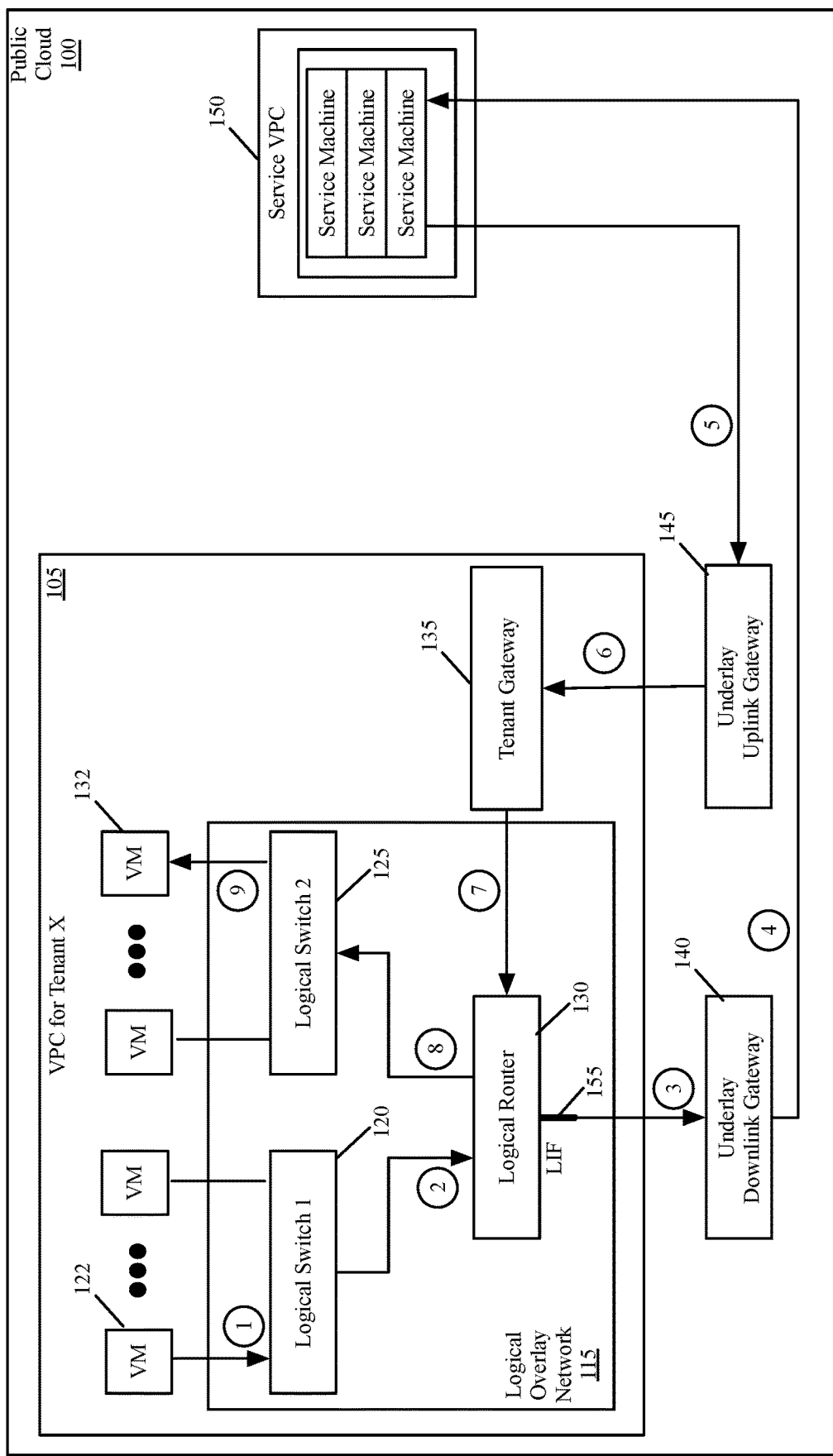
FIG. 1 presents an example that illustrates how some embodiments perform a service as a data message is sent from one machine to another machine in a public cloud environment.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel way to insert a service (e.g., a third party service) in the path of a data message flow between two machines (e.g., two VMs, two containers, etc.) in a public cloud environment. For a particular tenant of the public cloud, some embodiments create an overlay logical network with a logical overlay address space. To perform a service on data messages of a flow between two machines, the logical overlay network passes to the public cloud's underlay network the data messages with their destination address (e.g., destination IP addresses) defined in the logical overlay network.

The underlay network (e.g., an underlay default downlink gateway) is configured to pass data messages with such destination addresses (e.g., with logical overlay destination addresses) to a set of one or more service machines. The underlay network (e.g., an underlay default uplink gateway) is also configured to pass to the particular tenant's public cloud gateway the processed data messages that are received from the service machine set, and that are addressed to logical overlay destination addresses. The tenant's public cloud gateway is configured to forward such data messages to a logical forwarding element of the logical network, which then handles the forwarding of the data messages to the correct destination machine.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to layer 2 (L2), layer 3 (L3), layer (4) L4, and layer 7 (L7) (or layer 2, layer 3, layer 4, layer 7) are references respectively to the second data link layer, the third network layer, the fourth transport layer, and the seventh application layer of the OSI (Open System Interconnection) layer model.

FIG. 1 presents an example that illustrates how some embodiments perform a service (e.g., a third party service) as a data message is sent from one machine to another machine in a public cloud environment. In this example, the machines are VMs 122/132 that execute on host computers in a public cloud 100. These VMs belong to one tenant of the public datacenter 100. The public cloud in some embodiments is at one physical datacenter location, while in other embodiments spans multiple physical datacenter locations (e.g., is in multiple cities).

Figure 2:
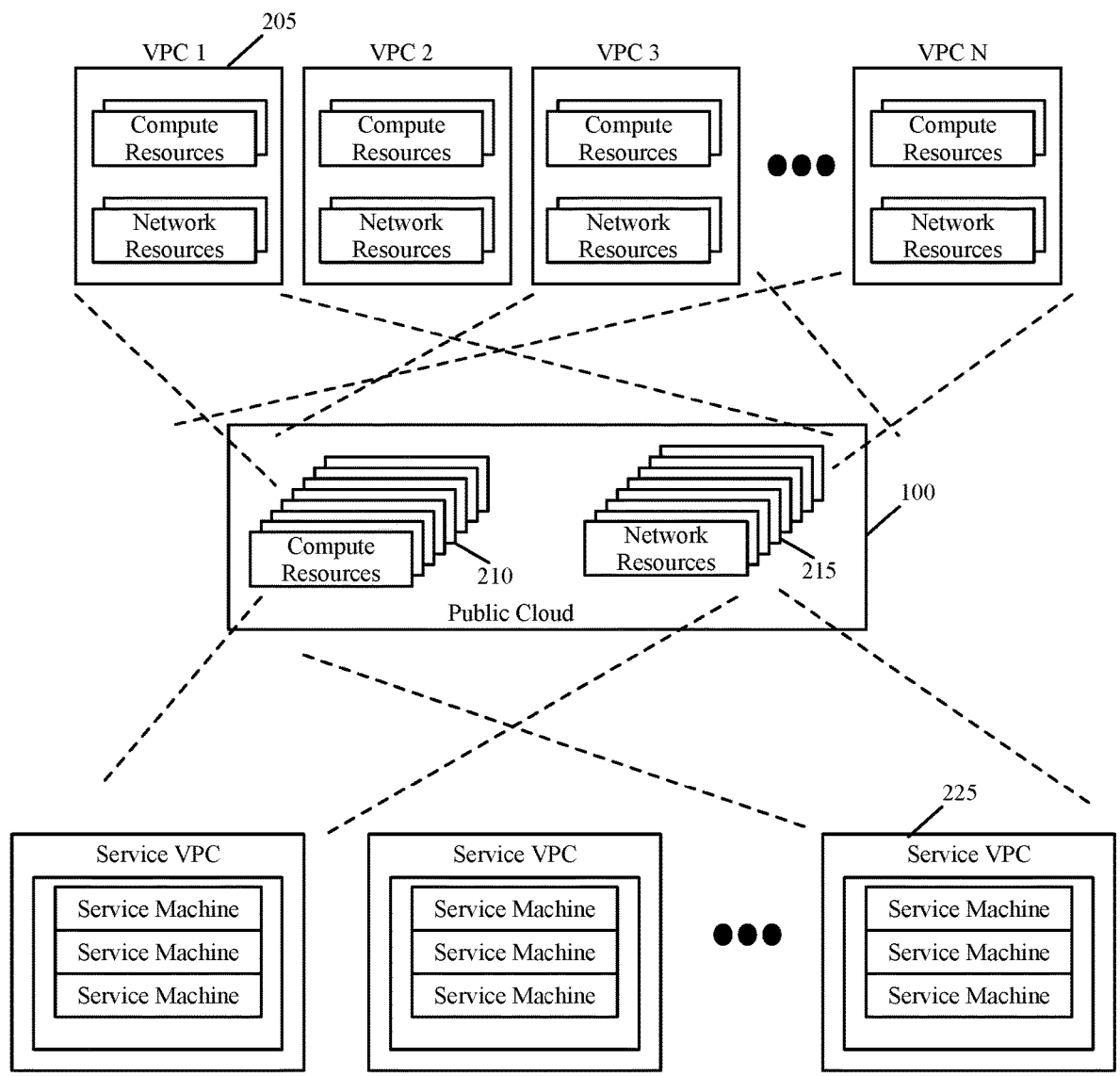
FIG. 2 illustrates examples of virtual private clouds in a public cloud environment.

As shown, this tenant has a virtual private cloud (VPC) 105 in the public cloud 100. FIG. 2 illustrates the VPCs 205 of the public cloud 100. These VPCs are different cloud tenants. As shown, the public cloud has numerous compute resources 210 (e.g., host computers, etc.) and network resources 215 (e.g., software switches and routers executing on the host computers, standalone switches and routers (such as top-of-rack switches), etc.). The network resources in some embodiments include middlebox service appliances and VMs in some embodiments. Each tenant's VPC uses a subset of the public cloud's compute and network resources. Typically, the public cloud provider uses compute virtualization and network virtualization/segmentation techniques to ensure that a tenant with one VPC cannot access the segregated machines and/or network of another tenant with another VPC.

As shown in FIG. 2, the public cloud datacenter 100 allows its tenants to create service VPCs 225. Each tenant's service VPC 225 includes one or more service appliances or machines (e.g., VMs or containers) that perform services (e.g., middlebox services, such as DPI, firewall, network address translation, encryption, etc.) on data messages exchanged between machines within the tenant's VPC as well as data messages entering and exiting the tenant's VPC 205. In some embodiments, all the service appliances and/or machines in a service VPC 225 are provided by third party vendors. In other embodiments, a subset of these appliances and/or machines are provided by third party vendors while the rest are provided by the public cloud provider and/or the tenant.

In the example illustrated in FIG. 1, the tenant VPC 105 uses one service VPC 150 to perform a set of one or more services on the data message that VM 122 sends to VM 132. As shown, the VPC 105 includes a logical overlay network 115. U.S. patent application Ser. No. 15/367,157, filed Dec. 1, 2016, now issued as U.S. Pat. No. 10,333,959, describes how some embodiments define a logical overlay network in a public cloud environment. U.S. patent application Ser. No. 15/367,157, now issued as U.S. Pat. No. 10,333,959, is incorporated herein by reference. The overlay logical network 115 is defined on top of the public cloud's underlay network, which, in some embodiments, is the VPC network provided by the cloud provider. The VPC network in some embodiments is also a logical overlay network provided by the cloud provider, while in other embodiments, it is just a portion segregated for the particular tenant from the rest of the provider's physical network (e.g., a portion with a segregated address space for the particular tenant).

As shown, the logical overlay network 115 includes two logical switches 120 and 125 and a logical router 130. Each logical switch spans multiple software switches on multiple host computers to connect several VMs on these host computers. Similarly, the logical router spans multiple software routers on multiple host computers to connect to the logical switch instances on these host computers. In some embodiments, the VMs connected to the two different logical switches 120 and 125 are on different subnets, while in other embodiments these VMs do not necessarily have to be on two different subnets.

As further shown, the tenant VPC 105 includes at least one tenant gateway 135. This VPC usually has multiple gateways for redundancy, and for handling north and south bound traffic out of and into the tenant VPC. For the tenant VPC 105, the public cloud also provides an underlay downlink gateway 140 and an underlay uplink gateway 145. These gateways forward messages out of and into the tenant VPC 105.

FIG. 1 illustrates the path that a data message takes from VM 122 to VM 132 in some embodiments. As shown, the logical switch 120 initially receives this message and forwards this message to the logical router 130, as the message's destination is not connected to the logical switch 120. The logical router is configured to forward data message flows between the two subnets associated with the two logical switches to the underlay network, so that the underlay network can forward the data messages to the service VPC to perform a set of one or more services on the data message flows. Some embodiments configure a logical interface (LIF) 155 of the logical router 130, as the interface associated with the underlay network's default downlink gateway 140 that is specified for the VPC network by the public cloud provider. In some such embodiments, the underlay default downlink gateway is the next hop (that is accessible through the LIF) for the data messages from VMs connected to logical switch 120 to the VMs connected to the logical switch 125.

The underlay default downlink gateway 140 is configured to send the data message destined to some or all logical overlay addresses to the service VPC 150, so that one or more service machines at this VPC can perform one or more services on the data message. Thus, when the logical router 130 provides the data message from VM 122 to the underlay downlink gateway 140, this gateway forwards this message to the service VPC 150.

One or more service machines 152 at the service VPC 150 are configured to perform one or more services on data messages received from the public cloud's underlay gateway 140 (e.g., on data messages that have source and/or destination addresses in the logical overlay address space). Examples of these service operations include typical middlebox service operations such as firewall operations, NAT operations, etc. The service machines 152 can be standalone service appliances (e.g., third party service appliances, such firewall appliances of Palo Alto Network, etc.), or they can be service machines (e.g., virtual machines, containers, etc.) executing on host computers. In the example illustrated in FIG. 1, the service machines are within a service VPC in the public cloud. In other embodiments, the service machines can be outside of the public cloud. In still other embodiments, the service machines are part of the tenant's VPC but outside of the tenant's logical overlay network 115.

When only one service machine performs a service on the data message from VM 122, the service machine 152 in the example of FIG. 1 provides the processed message to its uplink interface that handles the forwarding of data messages to networks outside of the service machine's VPC. On the other hand, when multiple service machines perform multiple service operations on this data message, the last service machine 152 in the example of FIG. 1 provides the processed message to its uplink interface. In either case, a separate route table of the service machine's uplink interface is configured to route the processed data message to the underlay default uplink gateway 145 for the particular tenant in the public cloud. When a service operation requires the message to be discarded, the message is discarded in some embodiments.

The underlay default uplink gateway 145 is configured to forward data messages that are destined to some or all logical overlay addresses to the particular tenant's cloud gateway 135. Hence, this gateway 145 forwards the data message from VM 122 to the tenant gateway 135. The tenant's cloud gateway 135 is configured to forward to the logical router 130 data messages that have destination addresses in the logical overlay address space.

Accordingly, the gateway forwards the processed data message to the logical router 130, which then forwards it to the logical switch 125. This switch then forwards the data message to the VM 132. For the logical switch 125 to forward the data message to VM 132, the data message is supplied by a logical router instance executing on one host computer to the logical switch instance (i.e., a software switch that implements the logical switch) that executes on the same host computer as VM 132. This logical switch instance then passes the data message to the VM 132.

Figure 3:
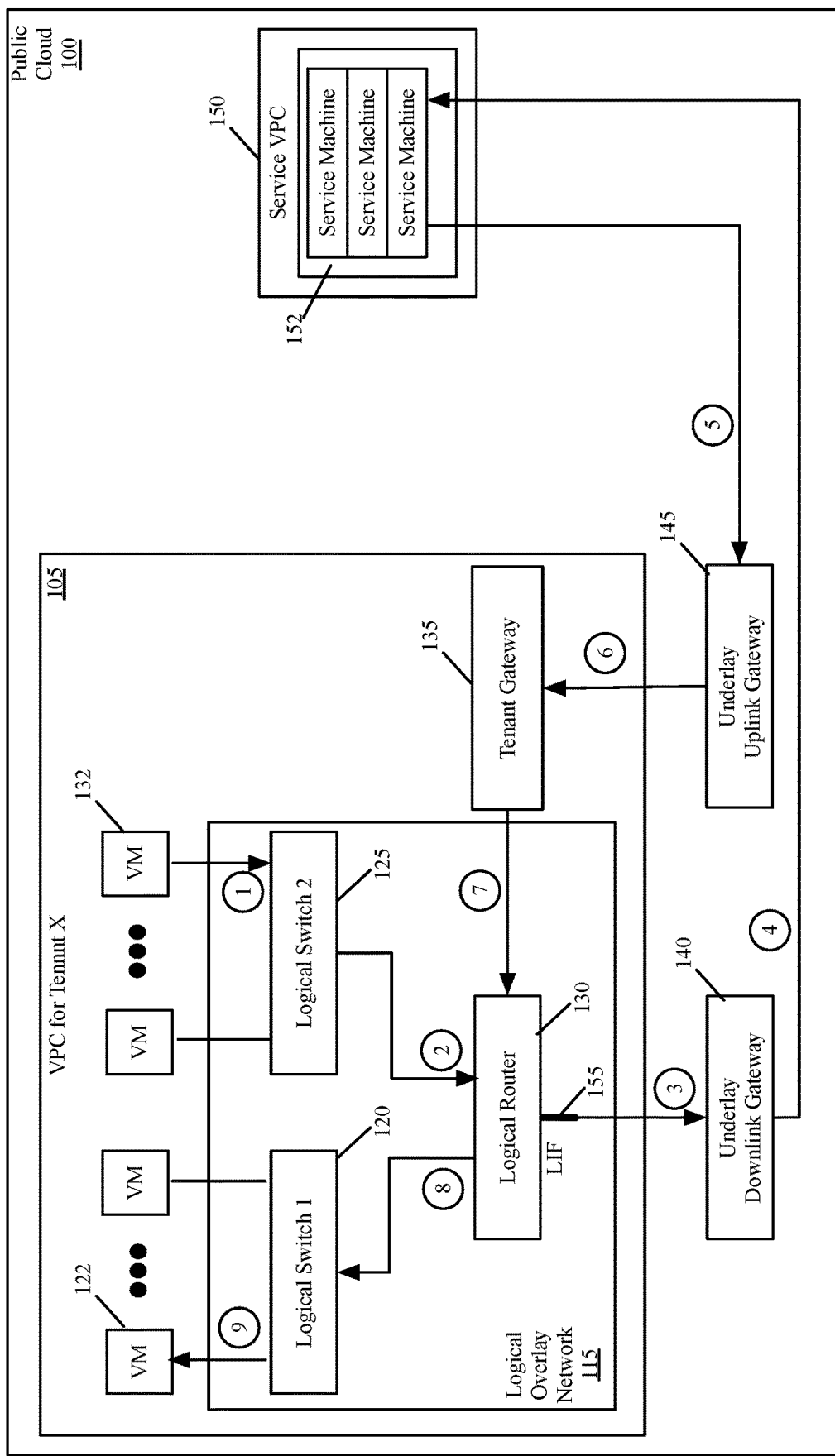
FIG. 3 presents an example that illustrates how some embodiments direct a reply message to one or more service machines.

In some embodiments, a service operation does not need to be performed on a reply message from VM 132 to VM 122. In other embodiments, such a service operation is needed. FIG. 3 presents an example that illustrates how some embodiments direct this reply message to one or more service machines 152 in the service VPC 150. As shown, the path that this reply message takes is identical to the path of the original message from VM 122 to VM 132, except that the reply message (1) initially goes from the VM 132 to the logical switch 125, and then to logical router 130, and (2) after being processed by the service VPC and passed to the underlay uplink gateway 145 and then the tenant gateway, goes from the logical router 130 to the logical switch 120 to reach VM 122. The reply message traverses the same path as the original message when it goes from the logical router 130 to the underlay downlink gateway 140, and then to the service VPC 150, the underlay uplink gateway 145 and then the tenant gateway 135.

Figure 4:
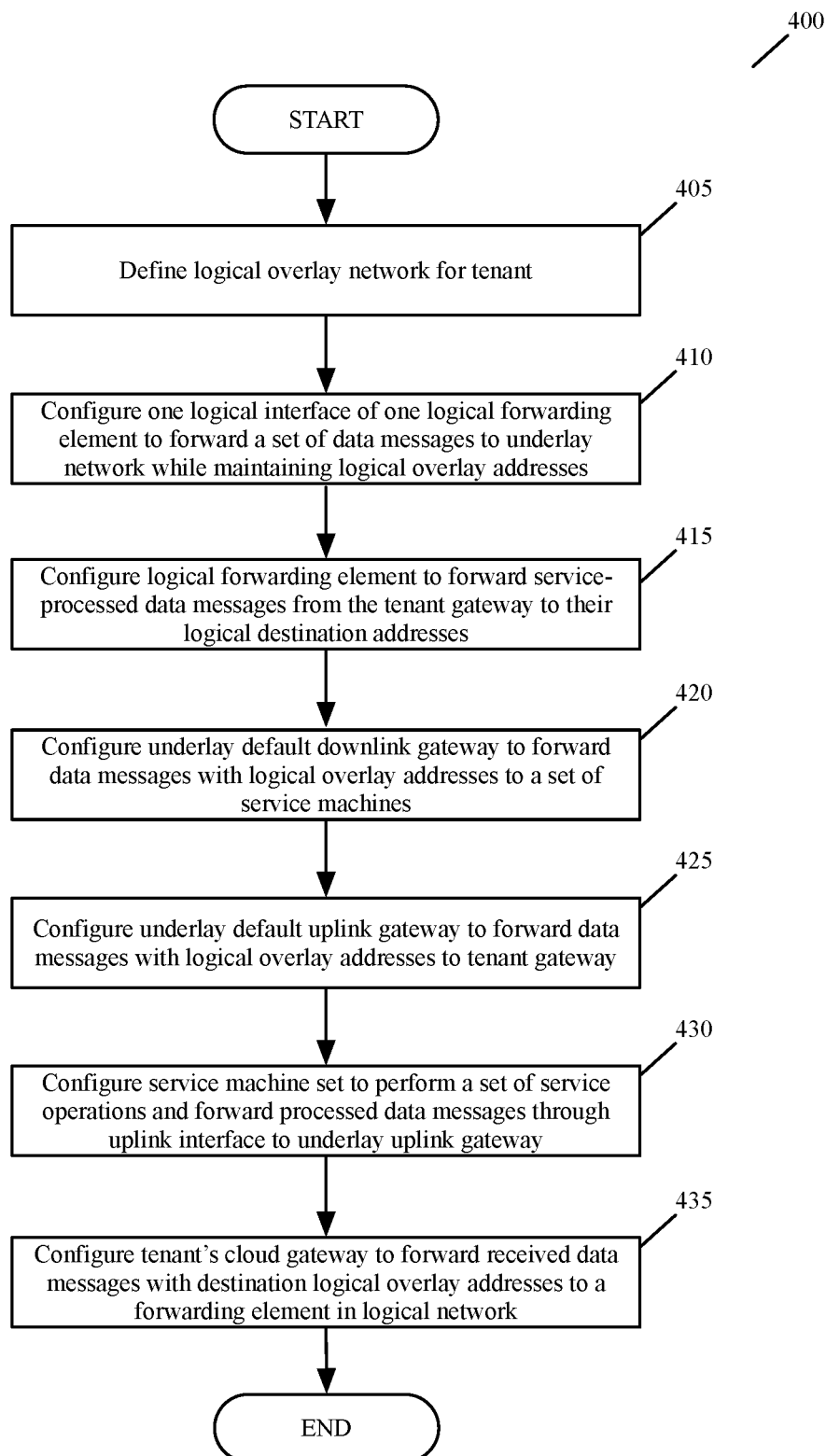
FIG. 4 illustrates a process that a set of one or more network controllers of some embodiments perform to configure the logical network elements, the underlay network elements, the service machines, and the tenant gateways.

FIG. 4 illustrates a process 400 that a set of one or more network controllers of some embodiments perform to configure the logical network elements, the underlay network elements, the service machines, and the tenant gateways. The process 400 configures the network and service elements to direct data message flows, between different machines (e.g., two VMs, two containers, etc.) of a particular tenant of a public cloud, to one or more service machines, so that they can perform one or more services on the data message flows. The process 400 will be explained by reference to FIG. 5, which presents examples of how the network and service elements in FIGS. 1 and 3 are configured in some embodiments.

In some embodiments, the network controller set that performs the process 400 is deployed in a tenant VPC. In other embodiments, the network controller set is deployed in a management VPC in the public cloud. This public cloud provider in some embodiments provides and operates the management VPC, while a third-party provider in other embodiments deploys and operates the management VPC. Also, in some embodiments, the network controller set resides in a private datacenter outside of the public cloud environment. Several examples of network controller sets are described in the above-incorporated U.S. patent application Ser. No. 15/367,157.

As shown, the process 400 in some embodiments initially creates (at 405) an overlay logical network with a distinct overlay address space. The logical overlay network 115 is one example of such an overlay logical network. The overlay logical network is defined (at 405) on top of the public cloud's underlay network, which, in some embodiments, is the VPC network provided by the cloud provider. The VPC network in some embodiments is also a logical overlay network provided by the cloud provider, while in other embodiments, it is just a portion segregated for the particular tenant from the rest of the provider's physical network (e.g., a portion with a segregated address space for the particular tenant).

Next, at 410, the process configures one or more logical forwarding elements (e.g., a logical router) of the overlay logical network to forward such data message flows to one or more forwarding elements of the underlay network, so that the underlay network can forward the data messages to service machines that perform the service on the data message flows. For instance, in some embodiments, the process configures a logical interface of a logical router of the logical overlay network to forward data messages that are directed to certain destination IP addresses, to an underlay default downlink gateway that is specified for the VPC network by the public cloud provider.

Figure 5:
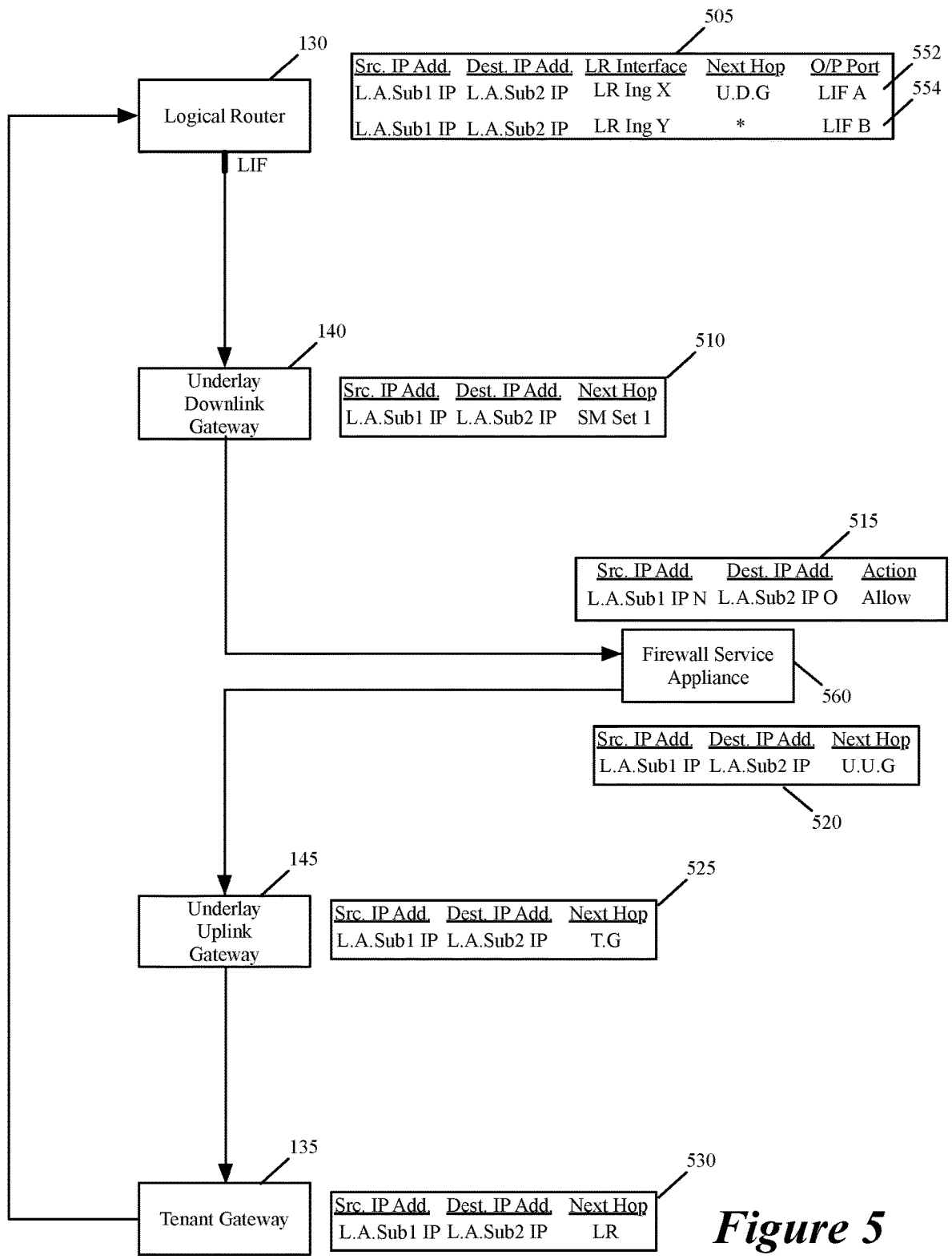
FIG. 5 presents examples of how the network and the service elements in FIGS. 1 and 3 are configured in some embodiments.

In some such embodiments, the process defines the underlay default downlink gateway as the next hop (that is accessible through the LIF) for the data messages that are directed to certain destination IP addresses. FIG. 5 illustrates a route table 505 of the logical router 130. As shown, the route table 505 has a first route record 552 that identifies the underlay default downlink gateway 140 as the next hop for any message from any logical IP address of subnet 1 (of the first logical switch 120) to any logical IP address of subnet 2 (of the second logical switch 125), when the data message is received along the logical router's ingress port X that is associated with the logical switch 120.

The process 400 also configures (at 415) one or more logical forwarding elements of the overlay logical network to forward data messages after they have been processed by the service machine(s) to their destination in the logical address space. FIG. 5 illustrates the route table 505 having a second route record 554 that identifies an interface (LIF B) associated with second logical switch 125 as the output port for any message from any logical IP address of subnet 1 (of the first logical switch 120) to any logical IP address of subnet 2 (of the second logical switch 125), when the data message is received on the logical router's ingress port Y that is associated with the tenant gateway 135.

Next, at 420, the process 400 configures the route table of an underlay network's forwarding element to send data messages destined to some or all logical overlay addresses to one or more service machines that perform one or more services on the data messages. FIG. 5 illustrates a route table 510 of the underlay downlink gateway 140. As shown, the route table 510 has a route record that identifies the service machine cluster 1 as the next hop for any message from any logical IP address of subnet 1 (of the first logical switch 120) to any logical IP address of subnet 2 (of the second logical switch 125).

At 425, the process also configures the route table of an underlay network's forwarding element (e.g., the underlay default uplink gateway) to forward data messages that are destined to some or all logical overlay addresses to the particular tenant's cloud gateway (e.g., the tenant gateway 135). FIG. 5 illustrates a route table 525 of the underlay uplink gateway 145. As shown, the route table 525 has a route record that identifies the tenant gateway 135 as the next hop for any message from any logical IP address of subnet 1 (of the first logical switch 120) to any logical IP address of subnet 2 (of the second logical switch 125).

The service machines can be standalone service appliances (e.g., third party service appliances, such firewall appliances of Palo Alto Network, etc.), or they can be service machines (e.g., virtual machines, containers, etc.) executing on host computers. The service machines in some embodiments are within the public cloud, while in other embodiments the service machines can be inside or outside of the public cloud.

At 430, the process 400 configures one or more service machines with one or more service rules that direct the service machines to perform one or more services on the data messages that it receives from the underlay forwarding element directly or through intervening network fabric. Each such service rule is defined in terms of one or more logical overlay addresses. For instance, in some embodiments, each service rule has a rule match identifier that is defined in terms of one or more flow identifiers, and one or more of these flow identifiers in the configured service rules are expressed in terms of logical overlay addresses. FIG. 5 illustrates an example one such service rule. Specifically, it shows a firewall rule table 515 with a firewall rule for a firewall service appliance 560. The firewall rule specifies that any data message from logical IP address N of VM 122 of subnet 1 to logical IP address 0 of VM 132 of subnet 2 should be allowed.

After performing its service(s) on a data message, the service machine provides the message to its uplink interface that handles the forwarding of data messages to networks outside of the service machine's network. The process 400 configures (at 430) a route table of the service machine's uplink interface to route the processed data messages to the underlay default uplink gateway for the particular tenant in the public cloud. FIG. 5 illustrates a route table 520 of the uplink interface of the firewall appliance 560. As shown, the route table 520 has a route record that identifies the underlay uplink gateway 145 as the next hop for any message from any logical IP address of subnet 1 (of the first logical switch 120) to any logical IP address of subnet 2 (of the second logical switch 125).

Next, at 435, the process configures the route table of the tenant gateway to route a data message that is addressed to a logical overlay network destination address to the correct destination machine (e.g., correct VM or container) in the particular tenant's VPC. FIG. 5 illustrates a route table 530 of the tenant gateway 135. As shown, the route table 530 has a route record that identifies the logical router 130 as the next hop for any message from any logical IP address of subnet 1 (of the first logical switch 120) to any logical IP address of subnet 2 (of the second logical switch 125). After 435, the process 400 ends.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
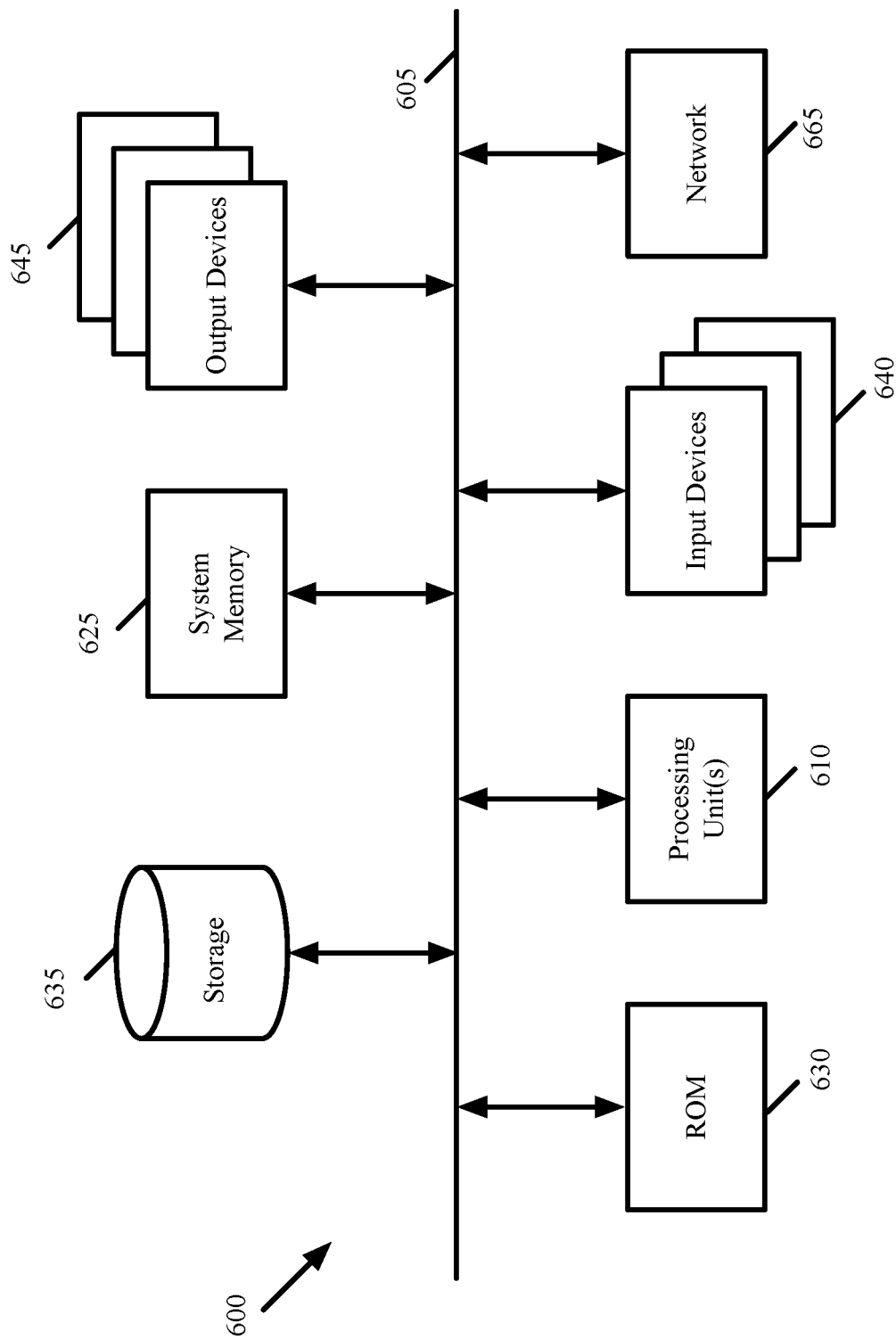
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described hosts, controllers, and managers. As such, it can be used to execute any of the above-described processes. This computer system includes various types of non-transitory machine-readable media and interfaces for various other types of machine-readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data, even when the computer system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory 625 is a volatile read-and-write memory, such a random access memory. The system memory 625 stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute, and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A method for providing a service for data messages exchanged between machines in a virtual private cloud (VPC) in a public cloud, the method comprising:
    establishing first and second VPCs for first and second tenants in the public cloud;
    configuring a first router for the first VPC and a second router for the second VPC respectively to connect a set of machines in each VPC, each VPC's router comprising at least one logical interface (LIF);
    configuring each VPC's router to direct, through the at least one LIF of the VPC's router, a subset of data messages exchanged between the VPC's machines to a shared network of the public cloud; and
    configuring the shared network to forward the subset of data messages, received from the at least one LIF of each VPC's router, to a common set of service machines that are deployed in a service VPC for use by multiple tenant VPCs, the common set of service machines performing a set of one or more services on a particular received data message of the subset of data messages and providing the particular received data message back to the shared network to forward the particular received data message to the VPC router that provided the particular received data message for the VPC router to forward the particular received data message to a destination machine in the VPC corresponding to the respective router with the at least one LIF.

2. The method of claim 1, wherein configuring the shared network comprises configuring at least one downlink gateway of the public cloud to forward the subset of data messages forwarded by at least one VPC's router to the common set of service machines.

3. The method of claim 2, wherein the at least one downlink gateway forwards to the common set of service machines the subset of data messages that it receives from each of at least two configured routers for each of at least two VPCs.

4. The method of claim 1, wherein the common set of service machines processes each data message forwarded by the shared network from each VPC's router.

5. The method of claim 1 further configuring a VPC gateway of each VPC to forward data messages processed by the common set of service machines to the respective VPC's configured router.

6. The method of claim 5, wherein configuring the shared network comprises configuring at least one uplink gateway of the public cloud to forward data messages of at least one VPC that are processed by the common set of service machines to the at least one VPC's configured router.

7. The method of claim 6, wherein the at least one uplink gateway of the public cloud is configured to forward data messages of at least two VPCs that are processed by the common set of service machines to at least two configured routers of the at least two VPCs.

8. The method of claim 1, wherein each VPC of each tenant has a network that is segregated from other networks of other VPCs of other tenants.

9. The method of claim 8, wherein the network for each tenant's VPC is a logical network defined over the shared network of the public cloud.

10. The method of claim 9, wherein the logical network for each VPC includes at least one logical router and at least one logical switch.

11. A non-transitory machine readable medium storing a program for providing a service for data messages exchanged between machines in a virtual private cloud (VPC) in a public cloud, the program for execution by at least one processing unit of a computer, the program comprising sets of instructions for:
    establishing first and second VPCs for first and second tenants in the public cloud;
    configuring a first router for the first VPC and a second router for the second VPC respectively to connect a set of machines in each VPC, each VPC's router comprising at least one logical interface (LIF);
    configuring each VPC's router to direct, through the at least one LIF of the VPC's router, a subset of data messages exchanged between the VPC's machines to a shared network of the public cloud; and
    configuring the shared network to forward the subset of data messages, received from the at least one LIF of each VPC's router, to a common set of service machines that are deployed in a service VPC for use by multiple tenant VPCs, the common set of service machines performing a set of one or more services on a particular received data message of the subset of data messages and providing the particular received data message back to the shared network to forward the particular received data message to the VPC router that provided the particular received data message for the VPC router to forward the particular received data message to a destination machine in the VPC corresponding to the respective router with the at least one LIF.

12. The non-transitory machine readable medium of claim 11, wherein the set of instructions for configuring the shared network comprises a set of instructions for configuring at least one downlink gateway of the public cloud to forward the subset of data messages forwarded by at least one VPC's router to the common set of service machines.

13. The non-transitory machine readable medium of claim 12, wherein the at least one downlink gateway forwards to the common set of service machines the subset of data messages that it receives from each of at least two configured routers for each of at least two VPCs.

14. The non-transitory machine readable medium of claim 11, wherein the common set of service machines processes each data message forwarded by the shared network from each VPC's router.

15. The non-transitory machine readable medium of claim 11, wherein the program further comprises a set of instructions for configuring a VPC gateway of each VPC to forward data messages processed by the common set of service machines to the respective VPC's configured router.

16. The non-transitory machine readable medium of claim 15, wherein configuring the shared network comprises configuring at least one uplink gateway of the public cloud to forward data messages of at least one VPC that are processed by the common set of service machines to the at least one VPC's configured router.

17. The non-transitory machine readable medium of claim 16, wherein the at least one uplink gateway of the public cloud is configured to forward data messages of at least two VPCs that are processed by the common set of service machines to at least two configured routers of the at least two VPCs.

18. The non-transitory machine readable medium of claim 11, wherein each VPC of each tenant has a network that is segregated from other networks of other VPCs of other tenants.

19. The non-transitory machine readable medium of claim 18, wherein the network for each tenant's VPC is a logical network defined over the shared network of the public cloud.

* * * * *